(12) United States Patent
Fukumiya

(10) Patent No.: US 12,338,009 B2
(45) Date of Patent: Jun. 24, 2025

(54) IMAGE CAPTURING SYSTEM EQUIPPED WITH DEVICE CAPABLE OF FLYING, METHOD OF CONTROLLING IMAGE CAPTURING SYSTEM, AND STORAGE MEDIUM

(71) Applicant: CANON KABUSHIKI KAISHA, Tokyo (JP)

(72) Inventor: Yoichi Fukumiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 18/457,964

(22) Filed: Aug. 29, 2023

(65) Prior Publication Data

US 2024/0067369 A1 Feb. 29, 2024

(30) Foreign Application Priority Data

Aug. 30, 2022 (JP) .................. 2022-137143

(51) Int. Cl.
| | | |
|---|---|---|
| *B64U 20/87* | (2023.01) | |
| *H04N 23/51* | (2023.01) | |
| *H04N 23/66* | (2023.01) | |
| *H04N 23/69* | (2023.01) | |
| *B64U 101/30* | (2023.01) | |

(52) U.S. Cl.
CPC ............ *B64U 20/87* (2023.01); *H04N 23/51* (2023.01); *H04N 23/66* (2023.01); *H04N 23/69* (2023.01); *B64U 2101/30* (2023.01); *B64U 2201/20* (2023.01)

(58) Field of Classification Search
CPC ............. B64U 20/87; B64U 2201/20; B64U 2101/30; H04N 23/66; H04N 23/69; H04N 23/51

USPC ........................................... 348/144
See application file for complete search history.

(56) References Cited

U.S. PATENT DOCUMENTS

| | | | |
|---|---|---|---|
| 6,349,173 B1 * | 2/2002 | Kanai ................. | G03B 17/04 396/90 |
| 6,404,988 B1 * | 6/2002 | Tanabe ................ | G03B 15/05 396/62 |
| 6,434,331 B1 * | 8/2002 | Araoka ............... | G03B 17/00 359/695 |
| 11,310,416 B2 | 4/2022 | Morita | |
| 11,881,680 B2 * | 1/2024 | Moon ................ | H01S 5/02326 |
| 2002/0025148 A1 * | 2/2002 | Sato .................... | G03B 17/00 396/542 |
| 2005/0001922 A1 * | 1/2005 | Lee .................... | H04N 7/142 348/340 |

(Continued)

FOREIGN PATENT DOCUMENTS

| | | |
|---|---|---|
| JP | 2012035800 A | 2/2012 |
| JP | 2019093749 A | 6/2019 |

*Primary Examiner* — Matthew David Kim
(74) *Attorney, Agent, or Firm* — Canon U.S.A., Inc., IP Division

(57) ABSTRACT

An image capturing system including a device that is capable of flying, and an image capturing apparatus that is attached to the device. The device includes a drive unit attached to the device that holds the image capturing apparatus and changes a position of the image capturing apparatus. The drive unit is controlled in a direction in which a lens of the image capturing apparatus is protected from an obstacle when image capturing is not performed by the image capturing apparatus.

7 Claims, 7 Drawing Sheets

(56) References Cited

U.S. PATENT DOCUMENTS

| | | | |
|---|---|---|---|
| 2015/0207964 A1* | 7/2015 | Bye | F16M 11/2014 |
| | | | 348/374 |
| 2016/0318456 A1* | 11/2016 | Moenig | G06V 10/147 |
| 2017/0242324 A1* | 8/2017 | Kuroda | H04N 5/74 |
| 2017/0244902 A1* | 8/2017 | DiMenichi | H04N 23/50 |
| 2019/0196182 A1* | 6/2019 | Naito | H04N 23/00 |
| 2022/0258670 A1* | 8/2022 | Hanchett | B60R 1/28 |
| 2022/0303473 A1* | 9/2022 | Sung | G06F 1/1641 |

* cited by examiner

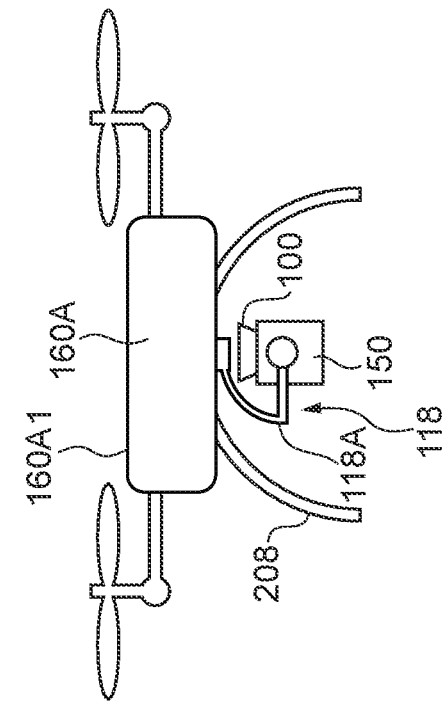
FIG. 3A
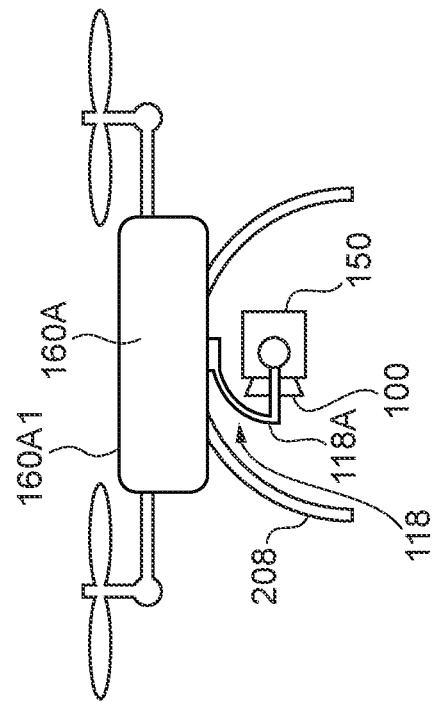
FIG. 3B
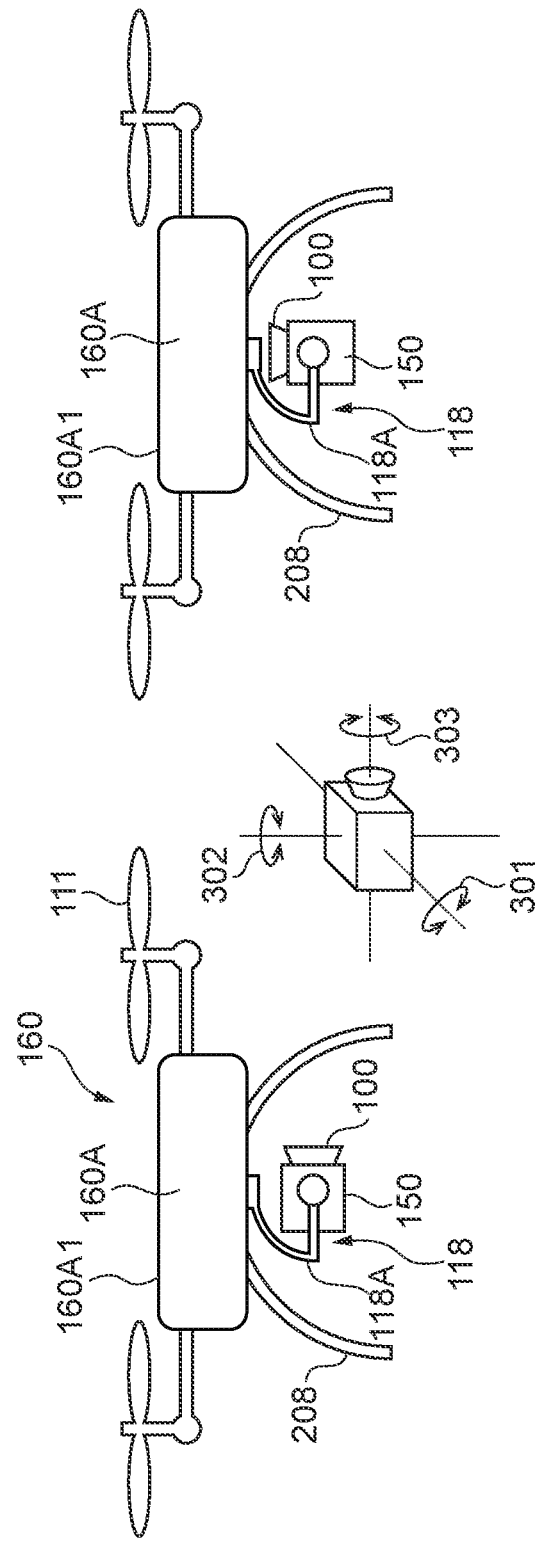
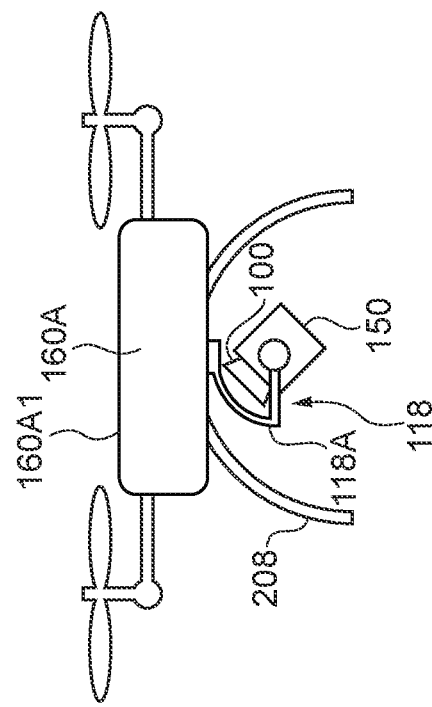
FIG. 3C
FIG. 3D

IMAGE CAPTURING SYSTEM EQUIPPED WITH DEVICE CAPABLE OF FLYING, METHOD OF CONTROLLING IMAGE CAPTURING SYSTEM, AND STORAGE MEDIUM

BACKGROUND

Field

The present disclosure relates to an image capturing system, a method of controlling the image capturing system, and a storage medium, and more particularly to position control of an image capturing apparatus mounted on a device that is capable of flying.

Description of the Related Art

In recent years, a technique of capturing a still image or a moving image from a variety of angles of view by mounting an image capturing apparatus (camera) on a device with flight functionality, i.e., a drone, and performing image capturing using the image capturing apparatus while flying the drone (aerial image capturing) has become popular. By mounting the image capturing apparatus on a gimbal fixed to the drone and changing the position of the image capturing apparatus using the function of the gimbal, it is possible to capture a still image or a moving image.

When aerial image capturing is performed using a drone, accidents can occur, such as where the drone collides with a flying object, such as a bird, or with a stationary object, such as a tree or a building. As a technique of protecting a drone from such accidents, Japanese Laid-Open Patent Publication (Kokai) No. 2019-93749 proposes mounting rod-shaped bumpers on a frame for holding a drone and attaching a net for covering the entire drone to the bumpers to form a protection device for the drone.

The technique described in Japanese Laid-Open Patent Publication (Kokai) No. 2019-93749 however has an issue that since the entire drone, including any image capturing apparatuses, is covered with the net, the net is included in the field of view of the image capturing apparatus. This results in degrading the quality of a captured still image or moving image.

In a case where the drone collides with an object, in general, even when the only damage is a few scratches on the body (main unit) of the drone or the casing of the image capturing apparatus, image capturing is not influenced. However, if a scratch is formed on a lens of the image capturing apparatus, image capturing becomes impaired. Therefore, it is very important to protect the lens of the image capturing apparatus.

SUMMARY

The present disclosure provides a technique that enables avoiding or reducing damage to a lens of an image capturing apparatus, even when a flying device including the image capturing apparatus collides with an object during flight, without degrading the quality of a captured still image or moving image.

According to a first aspect of the present disclosure, an image capturing system includes a device that is capable of flying, and an image capturing apparatus that is attached to the device, wherein the device includes a drive unit attached to the device that holds the image capturing apparatus and changes a position of the image capturing apparatus, and a control unit configured to control the drive unit in a direction in which a lens of the image capturing apparatus is protected from an obstacle in a case where image capturing is not performed by the image capturing apparatus.

According to a second aspect of the present disclosure, a method of controlling an image capturing system including a device that is capable of flying, an image capturing apparatus that is attached to the device, and a drive unit that is attached to the device to hold the image capturing apparatus and change a position of the image capturing apparatus includes controlling flight of the device, and controlling the drive unit in a direction in which a lens of the image capturing apparatus is protected from an obstacle in a case where image capturing is not performed by the image capturing apparatus during flight of the device.

According to the present disclosure, it is possible to avoid or reduce damage to the lens of an image capturing apparatus even when the flying device including the image capturing apparatus collides with an object during flight, without degrading the quality of a captured still image or moving image.

Further features of the present disclosure will become apparent from the following description of exemplary embodiments with reference to the attached drawings.

BRIEF DESCRIPTION OF THE DRAWINGS

FIGS. 3A to 3D are views each illustrating an example of a position that can be taken by the image capturing apparatus attached to the drone according to the embodiment.

DESCRIPTION OF THE EMBODIMENTS

The present disclosure will now be described in detail below with reference to the accompanying drawings showing embodiments thereof. In particular, a description will be provided of a configuration of an image capturing system including an image capturing apparatus located on a flying device, i.e., drone, where the image capturing apparatus's position can be changed to protect the image capturing apparatus.

Figure 1A:
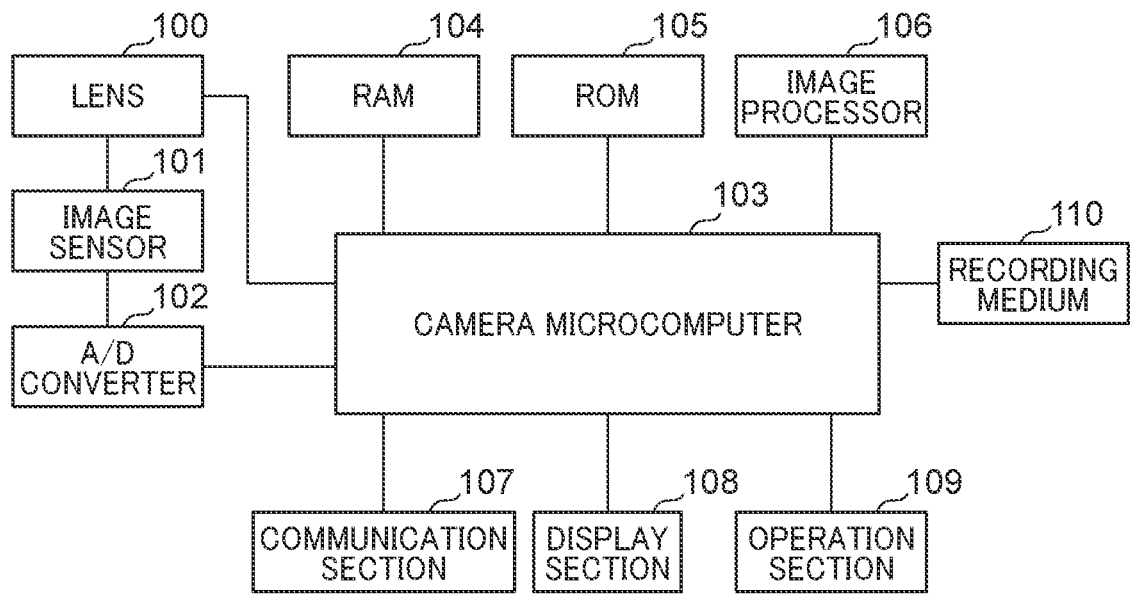
FIG. 1A is a block diagram illustrating a schematic configuration of an image capturing apparatus as a component of an image capturing system according to an embodiment of the present disclosure.

FIG. 1A is a block diagram illustrating a schematic configuration of an image capturing apparatus 150 as a component of an image capturing system according to an embodiment of the present disclosure. The image capturing apparatus 150 includes a lens 100, an image sensor 101, an analog-to-digital converter 102, a camera microcomputer 103, a RAM 104, a ROM 105, an image processor 106, a communication section 107, a display section 108, an operation section 109, and a recording medium 110.

In the present embodiment, the camera microcomputer 103 performs centralized control of the operations of components of the image capturing apparatus 150 by loading predetermined programs stored in the ROM 105 into the RAM 104. A focal length, a zoom position, and an aperture value are acquired from and set for the lens 100 based on control signals sent by the camera microcomputer 103. The lens 100 can be a single focus lens or a zoom lens. The lens 100 can be integrated with or removably attached to a casing of the image capturing apparatus 150. The lens 100 causes incident light passing therethrough to form an image on an imaging surface of the image sensor 101. The camera microcomputer 103 determines whether the lens 100 is attached, and acquires capability values of the lens 100. The capability values of the lens 100 refer to settable ranges of the focal length, the zoom, the aperture, the minimum image capturing distance, and so forth.

The image sensor 101 is for example, a CCD or a CMOS sensor, and converts an object image formed on the imaging surface by the lens 100 to analog electrical signals and outputs the signals to the analog-to-digital converter 102. The analog-to-digital converter 102 converts the analog electrical signals output from the image sensor 101 to image data formed by digital signals and outputs the image data to the camera microcomputer 103. The RAM 104 has a storage area for temporarily holding the image data output from the analog-to-digital converter 102, a storage area for storing settings of the image capturing apparatus 150, and a working storage area into which a program read from the ROM 105 is loaded.

The image processor 106 performs a variety of image processing operations on the image data, such as development of a still image and encoding of a moving image. These processing operations are performed in cooperation with the camera microcomputer 103 based on the settings stored in the ROM 105. The image processing operations also include generation of a live view image for confirming the composition and focus of an image to be captured when image capturing is performed. This processing operation is also performed in cooperation with the camera microcomputer 103. Supplemental information to be added to the live view image generated by the image processor 106 can be generated by the camera microcomputer 103. The supplemental information refers to, for example, information on a sprit level, information on the position and size of an autofocus (AF) frame indicating a position of an object as an autofocus target, and information on whether the object is in focus.

The communication section 107 communicably connects the image capturing apparatus 150 with an external device (not illustrated). The image capturing apparatus 150 receives an image capturing instruction, a request for transmitting a live view image, an instruction for controlling a lens, and so forth, from the external device. The image capturing apparatus 150 in turn transmits a live view image and the current value and capability value of each of the focal length and the like that are related to the control of the lens, to the external device via the communication section 107. The image capturing apparatus 150 has a function of turning off the power of the image capturing apparatus 150 in response to an instruction from the external device. While in the present embodiment, the drone 160 is described hereinafter as an example of the external device, the external device is not limited to this example, and the image capturing apparatus 150 can be connected to a plurality of different external devices.

The communication method between the image capturing apparatus 150 and the external device can be wired or wireless. In the present embodiment, since the drone 160 is the external device, wireless communication is used. The communication protocol between the image capturing apparatus 150 and the external device is not limited to a known protocol, such as HTTP or PTP, and can be an original protocol supported just by the image capturing apparatus 150 and the external device.

The display section 108 is implemented by, for example, a liquid crystal display device, and the display operation is controlled by the camera microcomputer 103. The items displayed on the display section 108 include, for example, a menu, a reproduced image, and a live view image. The operation section 109 is comprised of buttons and switches arranged on the casing of the image capturing apparatus 150, and a touch panel integrally provided on the display section 108, for a user to perform an operation based on the display on the display section 108.

The recording medium 110 is a recording means for storing image data of still images, moving images, and the like, and can be a card type, such as a CompactFlash (CF) card or a Secure Digital (SD) card, or can be a drive type, such as a solid-state drive (SSD) or a hard disk drive (HDD). The camera microcomputer 103 writes image data temporarily stored in the RAM 104 onto the recording medium 110 to store the image data and reads out the image data stored in the recording medium 110 into the RAM 104.

Application software that performs the functions of the display section 108 and the operation section 109 can be installed in the external device connected to the camera microcomputer 103 via the communication section 107. A configuration can be employed where image data and the like stored in the RAM 104 can be transmitted to an external device via the communication section 107 and stored in a recording medium included in the external device, and a variety of data stored in the recording medium of the external device can be read out into the RAM 104. At least one of the image capturing apparatus 150 or the external device need to be equipped with the functions of the display section 108, the operation section 109, and the recording medium 110.

Figure 1B:
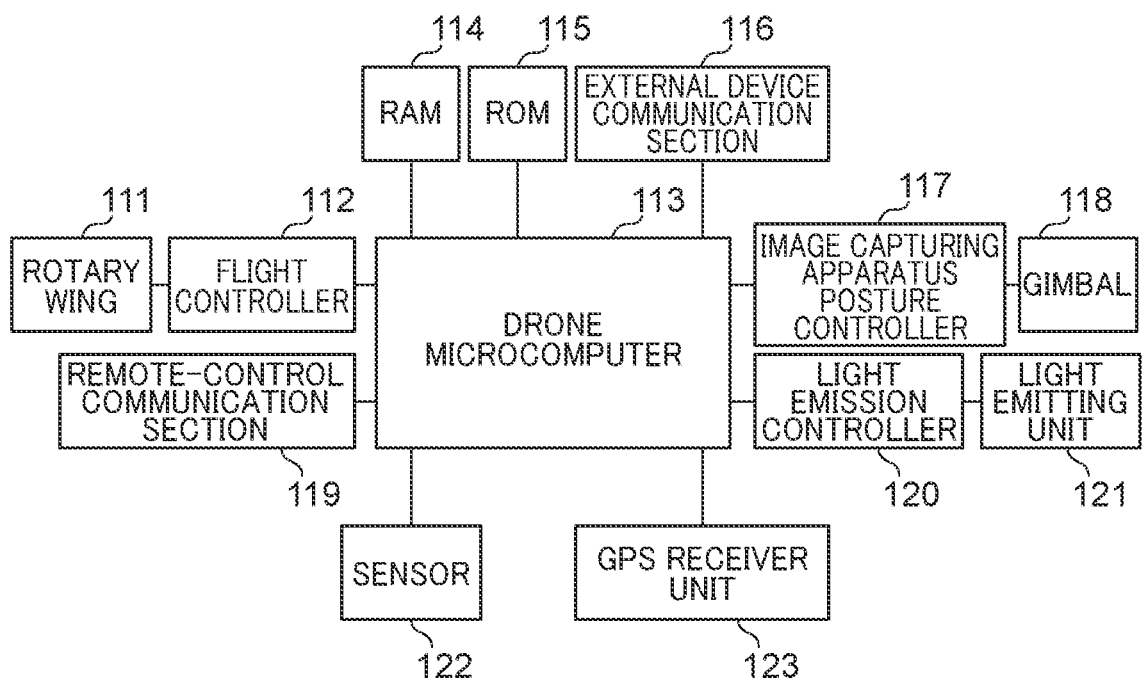
FIG. 1B is a block diagram illustrating a schematic configuration of a drone as a component of the image capturing system according to the embodiment.

FIG. 1B is a block diagram showing a schematic configuration of the drone 160 as a component of the image capturing system according to the present embodiment. The drone 160 includes rotary wings 111, a flight controller 112, a drone microcomputer 113, a RAM 114, a ROM 115, an external device communication section 116, a remote-control communication section 119, a light emission controller 120, a light emitting unit 121, a sensor 122, and a GPS receiver unit 123. The drone 160 also includes an image capturing apparatus position controller 117, a gimbal 118, and a leg part 208 (see FIG. 2).

The drone microcomputer 113 performs centralized control of the operations of components of the drone 160 by loading predetermined programs stored in the ROM 115 into the RAM 114. The sensor 122 is comprised of a gyro sensor, an acceleration sensor, a distance sensor, and an image sensor for observing conditions around the drone, and the drone microcomputer 113 performs a variety of controls based on data acquired by the sensor 122. The ROM 115 stores programs executed by the drone microcomputer 113, and the RAM 114 has a working storage area for loading a program read from the ROM 115.

The flight controller 112 performs flight control by controlling a rotational speed of the rotary wings 111 in cooperation with the drone microcomputer 113. The rotary wings 111 are arranged, for example, on four arm members radially extending from a main unit 160A of the drone 160 (see FIG. 2), respectively. The flight controller 112 performs the flight control to prevent the drone 160 from colliding with an object of which an image is to be captured, an obstacle or the like, based on information acquired from the sensor 122 in cooperation with the drone microcomputer 113. The algorithm for avoiding collision and the method of realizing collision avoidance for the drone 160 can be a known technique, and as such, a detailed description thereof is omitted herein.

The external device communication section 116 communicably connects the communication section 107 of the image capturing apparatus 150, enabling the image capturing apparatus 150 and the drone 160 to communicate with each other. The type of connection, the communication protocol, and contents of communication are similar to the description of the communication section 107 of the image capturing apparatus 150, and hence description thereof is omitted herein.

The number of external devices connected to the external device communication section 116 is not limited to one. For example, in a case where the drone 160 is an autonomous drone that flies and performs image capturing based on an image capturing plan created by setting a flight route and an image capturing position in advance, the image capturing apparatus 150, as well as a recording medium storing the image capturing plan can be connected as an external device to the drone 160.

The gimbal 118 is a drive unit that is fixed to the main unit 160A of the drone 160, holds the image capturing apparatus 150, and is driven by the image capturing apparatus position controller 117 and the drone microcomputer 113 to change the position (angle) of the image capturing apparatus 150. The image capturing apparatus position controller 117 controls the driving of the gimbal 118 in cooperation with the drone microcomputer 113.

The light emitting unit 121 is, for example, a light emitting diode (LED) and is mounted on the drone 160 to enable an operator to visually recognize the position and orientation of the drone 160. The light emission controller 120 performs light emission control of the light emitting unit 121.

The drone 160 can be the above-mentioned autonomous drone or a drone based on a remote-control communication method, whose flight is controlled by an operator operating a controller. In a case where the drone 160 is the autonomous drone, the flight controller 112 performs flight speed control and provides an image capturing instruction and the like to the image capturing apparatus 150 in cooperation with the drone microcomputer 113, based on the position information of the drone 160, which is received by the GPS receiver unit 123, and the information acquired by the sensor 122. In a case where the drone 160 is the drone controlled by the remote-control communication method, the flight controller 112 receives a control command via the remote-control communication section 119 and controls the flight of the drone 160 and image capturing using the image capturing apparatus 150 in cooperation with the drone microcomputer 113.

Figure 2:
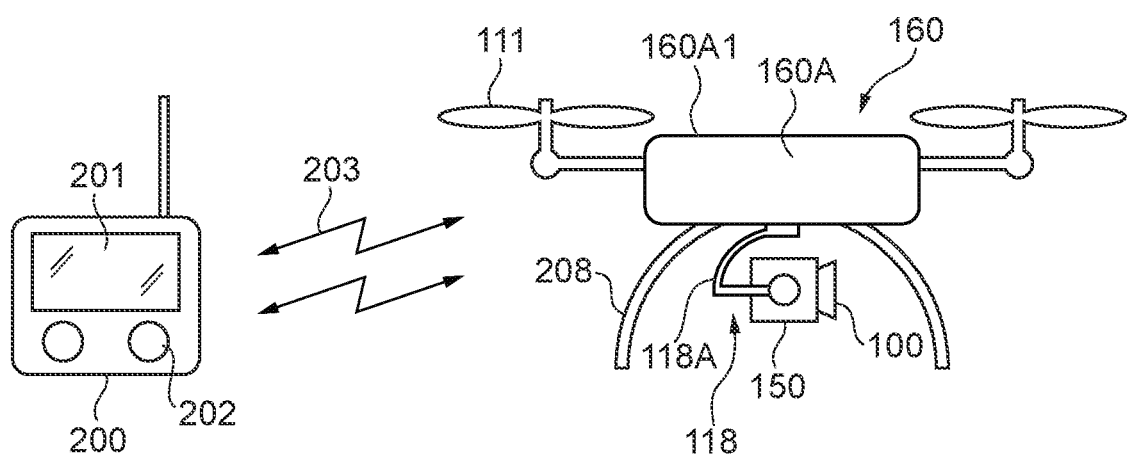
FIG. 2 is a view illustrating a schematic configuration of the image capturing system.

FIG. 2 is a view illustrating a schematic configuration of the image capturing system. An operator can control the drone 160 and the image capturing apparatus 150 by operating a controller 200. More specifically, by operating an operation section 202 provided on the controller 200, the operator can control flight operations of the drone 160, including takeoff, landing, forward movement, and rotation of the drone 160, and control driving of the gimbal 118. The leg part 208, which rests on the ground when the drone 160 is located on the ground, is fixed to the main unit 160A of the drone 160. The leg part 208 is bow shaped (arcuate shape), and has three or four legs arranged radially at equally spaced intervals.

The main unit 160A is comprised of the flight controller 112, the drone microcomputer 113, the RAM 114, the ROM 115, the external device communication section 116, the remote-control communication section 119, the light emission controller 120, the light emitting unit 121, the sensor 122, and the GPS receiver unit 123, which are contained in a casing 160A1. The leg part 208 has sufficient length to accommodate the image capturing apparatus 150 in a hemispherical space defined by the leg part 208, and prevents the image capturing apparatus 150 from touching the ground when the drone 160 is located on the ground.

The control of the image capturing apparatus 150 is performed via the drone 160. More specifically, as described above, the drone 160 and the image capturing apparatus 150 can perform bidirectional communication. Therefore, for example, the control of the image capturing apparatus 150 can be performed by operating the operation section 202 of the controller 200 to transmit a command to the camera microcomputer 103 of the image capturing apparatus 150 via the drone microcomputer 113 of the drone 160.

The live view image captured by the image capturing apparatus 150 is transmitted to the controller 200 via the camera microcomputer 103 and the communication section 107 of the image capturing apparatus 150 and the external device communication section 116, the drone microcomputer 113, and the remote-control communication section 119 of the drone 160. Thus, the live view image captured by the image capturing apparatus 150 is displayed on a display section 201 provided on the controller 200. This enables the operator to, for example, capture a still image or check an angle of view of a moving image, while confirming the live view image on the display section 201.

The display section 201 can display the live view image as well as the position information of the drone 160 based on the GPS information received by the drone 160, and information on the flight speed and the like of the drone 160. When an error occurs in cooperation between the image capturing apparatus 150 and the drone 160, details of the error are displayed on the display section 201, which enables the operator to recognize that an issue occurred in the image capturing apparatus 150, the drone 160, or both.

In FIG. 2, remote-control radio waves 203 for controlling the drone 160 are schematically illustrated between the controller 200 and the drone 160. It is assumed that a transmitter and receiver for radio control, generally referred to as the proportional set, is used as the controller 200. The drone 160 is sometimes flown at an altitude of several hundred meters, and hence it is desirable to use radio waves of wireless communication having a long communicable distance for the remote-control radio waves 203, but the method of communication between the controller 200 and the drone 160 is not limited.

FIGS. 3A to 3D are views each illustrating an example of a position that can be taken by the image capturing apparatus 150 attached to the drone 160. In FIGS. 3A to 3D, the drone 160 is in a horizontal position with respect to the ground.

As illustrated in FIG. 3A, the gimbal 118 holding the image capturing apparatus 150 has at least a tilt control axis 301, but can further have a pan control axis 302 and a roll control axis 303. When image capturing is performed by the image capturing apparatus 150, the gimbal 118 is controlled, for example, as shown in FIG. 3A, such that image capturing is performed via a space between legs of the leg part 208 so as not to include the leg part 208 in the image capturing angle of view. As illustrated in FIG. 3A, the lens 100 is oriented in the horizontal direction. However, in some cases, image capturing is performed by rotating the lens 100 to face downward. In most cases, image capturing is performed at an angle between the horizontal direction and the downward direction.

When image capturing is not performed, to protect the lens 100, the gimbal 118 is controlled so that the lens 100 faces toward the main unit 160A of the drone 160 (upward direction), as illustrated in FIG. 3B. During the flight of the drone 160, including, for example, a state where the drone 160 is hovering at a predetermined point in the air, there is a possibility that an obstacle with a size that can pass through space in the leg part 208 of the drone 160 collides with the image capturing apparatus 150. This is an example of why the lens 100 is oriented toward the main unit 160A of the drone 160 when image capturing is not performed, which enables reducing the probability of an obstacle colliding with the lens 100 even if the obstacle passes through the space in the leg part 208 of the drone 160.

The direction in which the lens 100 is rotated to protect the lens 100 is not limited to the direction facing the main unit 160A of the drone 160. For example, as illustrated in FIGS. 3C and 3D, in a case where it is possible to adjust the orientation of the image capturing apparatus 150 such that at least part of a frame 118A of the gimbal 118 is positioned forward of the front end face of the lens 100, the image capturing apparatus 150 can be oriented in such a direction.

In the position illustrated in FIG. 3B, it is possible to protect the lens 100 regardless of the flying direction (traveling direction) of the drone 160. In the positions illustrated in FIGS. 3C and 3D, it is possible to enhance the effect of protecting the lens 100 by causing the drone 160 to fly such that the lens 100 is oriented in a backward direction (opposite direction to the flying direction).

To enhance flight stability by facilitating adjustment of the drive load balance of the rotary wings of the drone on which the image capturing apparatus is mounted, it is desirable that an axis that passes through the center of gravity of the drone and is parallel to the vertical direction coincides with an axis that passes through the center of gravity of the image capturing apparatus and is parallel to the vertical direction. The lens 100 is generally comprised of a plurality of glass lenses, and depending on the lens 100 attached to the image capturing apparatus 150, the center of gravity of the image capturing apparatus 150 is sometimes positioned toward the lens 100. In this case, the center of gravity of the image capturing apparatus 150 can shift toward the lens 100 from the axis passing through the center of gravity of the drone 160 as a single unit in the states illustrated in FIGS. 3A, 3C, and 3D.

In the state illustrated in FIG. 3B, in which the lens 100 is oriented toward the main unit 160A of the drone 160, the axis that passes through the center of gravity of the image capturing apparatus 150 and is parallel to the vertical direction and the axis that passes through the center of gravity of the drone 160 and is parallel to the vertical direction are more likely to coincide with each other. This enables realizing a good balance of the load applied to the rotary wings 111. While the main unit 160A of the drone 160 tilts when the drone 160 is translationally moved, the center of gravity is difficult to move in the state illustrated in FIG. 3B, and thus the drone 160 can stably fly. Therefore, as the position of the image capturing apparatus 150 when image capturing is not performed, it is desirable that the lens 100 is oriented toward the main unit 160A of the drone 160 as illustrated in FIG. 3B rather than the states illustrated in FIGS. 3C and 3D.

The gimbal 118 has a mechanism for locking, after being driven to a position for protecting the lens 100, in the position to hold the position of the image capturing apparatus 150. This enables stopping the control for preventing the image capturing apparatus 150 from being shaken when controlling the flight of the drone 160, and thus, it is possible to reduce power consumption.

In a case where the length of a lens barrel containing the lens 100 is variable, it is desirable to control the length of the lens barrel after locking the state of the gimbal 118 and thus the image capturing apparatus 150 in the position for protecting the lens 100. That is, the drone microcomputer 113 controls the driving of the gimbal 118 to place the image capturing apparatus 150 in the state illustrated in FIG. 3B. After that, the drone microcomputer 113 instructs the camera microcomputer 103 to control the length of the lens barrel such that the front end face of the lens 100 becomes closer to the main unit 160A of the drone 160. The camera microcomputer 103 adjusts the length of the lens barrel in response to the instruction from the drone microcomputer 113. Thus, it is possible to enhance the effect of protecting the lens 100 by reducing space between the lens 100 and the main unit 160A of the drone 160.

Figure 4A:
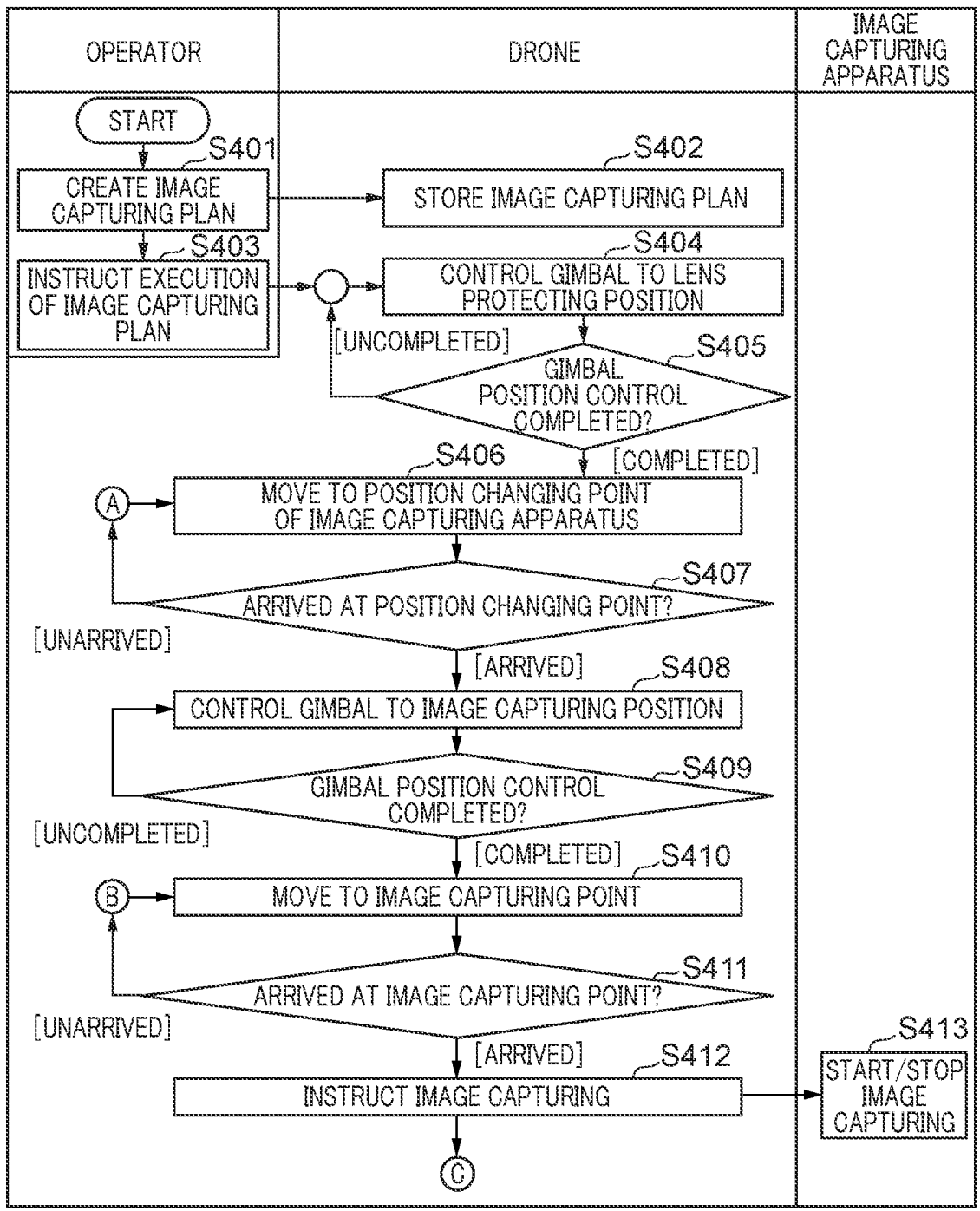
FIG. 4A is an activity diagram illustrating a flow of first control of the image capturing system.
Figure 4B:
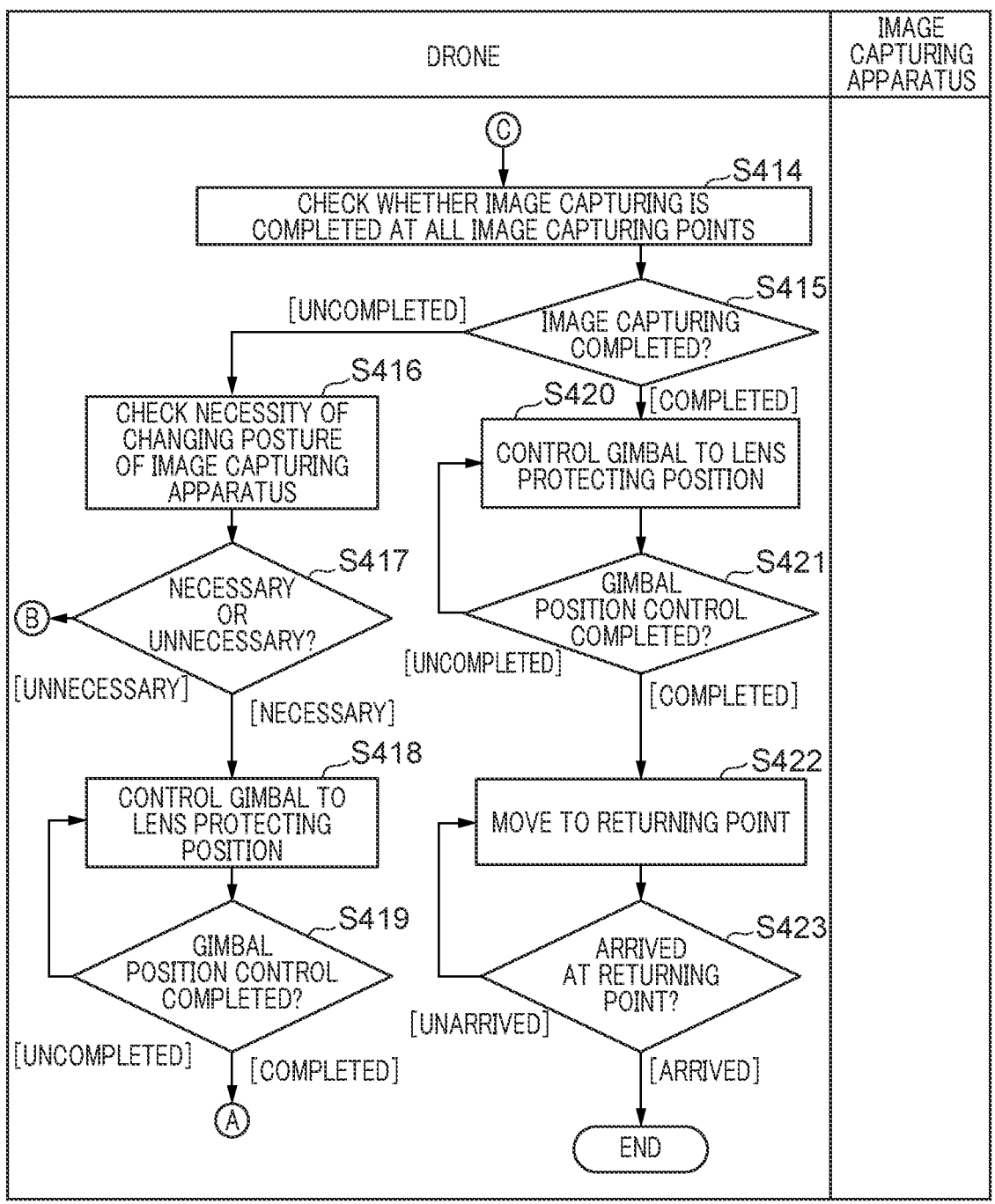
FIG. 4B is a continuation of FIG. 4A.

Next, the control of the drone 160 and the image capturing apparatus 150 will be described. FIGS. 4A and 4B is an activity diagram illustrating a flow of first control performed when image capturing is performed by the image capturing apparatus 150 while flying the drone 160. In the first control, the control to perform image capturing by using the image capturing apparatus 150 while causing the drone 160 to perform so-called autonomous flight will be described.

In the control of the drone 160 in FIGS. 4A and 4B, control associated with the flight is performed by the flight controller 112 and the drone microcomputer 113 in cooperation, and control associated with the position of the image capturing apparatus 150 is performed by the image capturing apparatus position controller 117 and the drone microcomputer 113 in cooperation. In the following description provided with reference to FIGS. 4A and 4B and with reference to an activity diagram in FIGS. 5A and 5B, the term "the drone microcomputer 113" is used for convenience' sake as a control entity of the control related to the flight of the drone 160 and the control related to the position of the image capturing apparatus 150.

Referring to FIG. 4A, in step S401, the operator creates an image capturing plan using, for example, a personal computer (PC). The image capturing plan represents a sequence of movements of the drone 160, position changes of the image capturing apparatus 150, and image capturing operations. The image capturing plan is assumed to include at least a flight route and flight speeds of the drone 160, points where image capturing is to be performed by the image capturing apparatus 150, points where the position of the image capturing apparatus 150 is to be changed by the gimbal 118, and position information of the image capturing apparatus 150. Each image capturing point is a point where the start or stop of image capturing is instructed. The image capturing plan can include image capturing conditions, such as an opening of a diaphragm and an exposure time in the image capturing apparatus 150, at each image capturing point.

In step S402, the drone microcomputer 113 stores the image capturing plan in the RAM 114. The transfer of the image capturing plan to the RAM 114 can be performed via the external device communication section 116 using a known technique, and therefore, a detailed description thereof is omitted herein. A recording medium storing the image capturing plan can be connected to the external device communication section 116, and the image capturing plan can be read from the recording medium and stored in the RAM 114 in a timely fashion.

In step S403, the operator operates the controller 200 to instruct the drone microcomputer 113 to execute the image capturing plan. In step S404, the drone microcomputer 113 performs control to position the gimbal 118 in the lens protecting position. When the gimbal 118 is in the lens protecting position, the image capturing apparatus 150 can be placed in a state where the lens 100 is protected, as illustrated in any of FIGS. 3B to 3D. In the present embodiment, the lens protecting position is stored in the ROM 115 in advance, and is read out from the ROM 115 into the RAM 114 for use when the control program of the drone 160 is executed. This method is not seen to be limiting, and in another embodiment, the operator can determine the lens protecting position by operating the gimbal 118 from the controller 200 and instruct the drone microcomputer 113 to store the determined lens protecting position in the RAM 114 of the drone 160.

In step S405, the drone microcomputer 113 determines whether the control to position the gimbal 118 in the lens protecting position is completed. If it is determined that the positioning is not completed, the flow returns to step S404. If it is determined that the positioning is completed, the drone microcomputer 113 locks the gimbal 118 and the flow proceeds to step S406.

In step S406, the drone microcomputer 113 controls the movement (flight) of the drone 160 to a first position changing point of the image capturing apparatus 150 according to the image capturing plan. In step S407, the drone microcomputer 113 determines whether the drone 160 has arrived at the first position changing point of the image capturing apparatus 150. If it is determined that the drone 160 has not arrived at the first position changing point, the flow returns to step S406. If it is determined that the drone 160 has arrived at the first position changing point, the drone microcomputer 113 releases the gimbal 118 from the locked state and the flow proceeds to step S408.

In step S408, the drone microcomputer 113 performs control to position the gimbal 118 in an image capturing position. When the gimbal 118 is in the image capturing position, the image capturing apparatus 150 is kept in a state where the lens 100 is oriented toward an object (e.g., the state illustrated in FIG. 3A). In step S409, the drone microcomputer 113 determines whether the control to position the gimbal 118 in the image capturing position is completed. If it is determined that the positioning is not completed, the flow returns to step S408. If it is determined that the positioning is completed, the flow proceeds to step S410.

In step S410, the drone microcomputer 113 controls the movement (flight) of the drone 160 toward an image capturing point. In a step S411, the drone microcomputer 113 determines whether the drone 160 has arrived at the image capturing point. If it is determined that the drone 160 has not arrived at the image capturing point, the flow returns to step S410. If it is determined that the drone 160 has arrived at the image capturing point, the flow proceeds to step S412.

In step S412, the drone microcomputer 113 instructs the camera microcomputer 103 of the image capturing apparatus 150 to perform image capturing. In step S413, the camera microcomputer 103 starts image capturing performed by the image capturing apparatus 150 based on the instruction from the drone 160. At this time, the camera microcomputer 103 can notify the drone microcomputer 113 of completion of the image capturing, and upon receipt of the image capturing completion notification, the drone microcomputer 113 can perform processing for recording the success or failure of the image capturing and the like processing.

Referring to FIG. 4B, in step S414 following step S412, the drone microcomputer 113 checks whether the image capturing is completed at all image capturing points. In step S415, if the drone microcomputer 113 determines that there is an image capturing point where image capturing has not yet been performed yet, the flow proceeds to step S416.

In step S416, the drone microcomputer 113 checks whether it is necessary to change the position of the image capturing apparatus 150 before the drone 160 arrives at the next image capturing point. In step S417, if the drone microcomputer 113 determines that it is not necessary to change the position of the image capturing apparatus 150, the flow returns to step S410. If it is determined that it is necessary to change the position of the image capturing apparatus 150, the flow proceeds to step S418.

In step S418, the drone microcomputer 113 performs control to position the gimbal 118 in the lens protecting position. In step S419, the drone microcomputer 113 determines whether the control to position the gimbal 118 in the lens protecting position is completed. If it is determined that the positioning is not completed, the flow returns to step S418. If it is determined that the positioning is completed, the drone microcomputer 113 locks the gimbal 118 and the flow returns to step S406. This enables protecting the lens 100, for example, in a case where the distance to move without image capturing is long. In a case where a moving image is captured, the process is performed in the order of steps S414, S415, S416, S417, S410, S411, and S412, and the image capturing apparatus 150 stops the image capturing in step S413.

Returning to step S415, if the drone microcomputer 113 determines that all image capturing has been performed, the flow proceeds to step S420. In the step S420, the drone microcomputer 113 performs control to position the gimbal 118 in the lens protecting position. In step S421, the drone microcomputer 113 determines whether the control to position the gimbal 118 in the lens protecting position is completed. If it is determined that the positioning is not completed, the flow returns to step S420. If it is determined that the positioning is completed, the drone microcomputer 113 locks the gimbal 118 and the flow proceeds to step S422.

In step S422, the drone microcomputer 113 controls the movement (flight) of the drone 160 to a returning point. In step S423, the drone microcomputer 113 determines whether the drone 160 has arrived at the returning point. If it is determined that the drone 160 has not arrived at the returning point, the flow returns to step S422. If it is determined that the drone 160 has arrived at the returning point, the drone microcomputer 113 terminates the present process. With this, the image capturing plan is completed.

In another embodiment, the operator instructs the drone 160 to urgently return for the operator's convenience. In another embodiment, where communication between the controller 200 and the drone 160 is interrupted or the battery charge level of the drone 160 is significantly lowered, the drone microcomputer 113 of the drone 160 can issue an urgent returning instruction. In both embodiments, the drone microcomputer 113 immediately controls the gimbal 118 to the lens protecting position (steps S420 and S421) and moves the drone 160 to the returning point (steps S422 and S423).

Figure 5A:
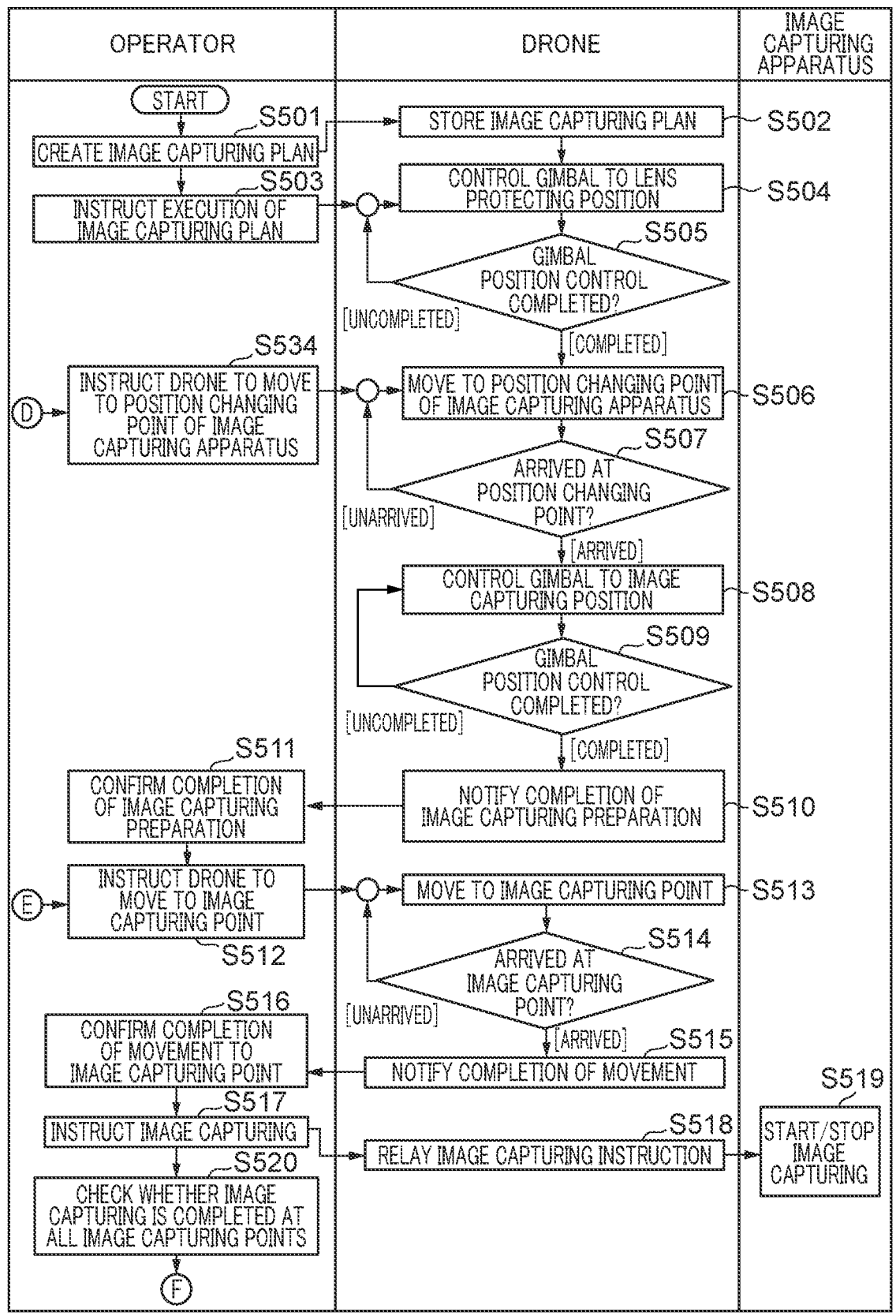
FIG. 5A is an activity diagram illustrating a flow of second control of the image capturing system.
Figure 5B:
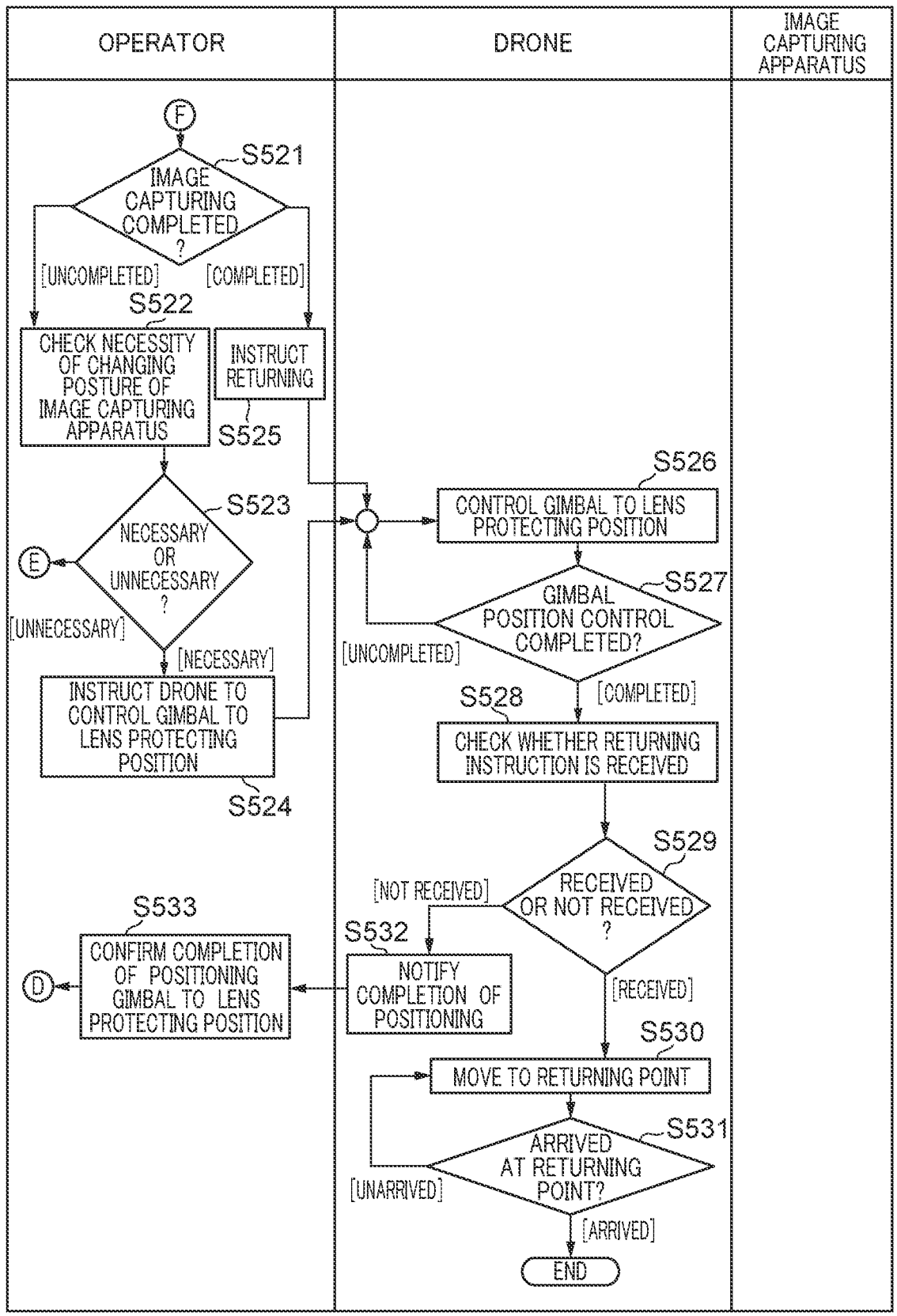
FIG. 5B is a continuation of FIG. 5A.

FIGS. 5A and 5B are the activity diagram illustrating a flow of second control performed when image capturing is performed by the image capturing apparatus 150 while flying the drone 160. In the second control, the image capturing procedure from completion of the image capturing preparation to issuance of the returning instruction is executed based on instructions of the operator via the controller 200. Completion of the image capturing preparation refers to completion of positioning of the gimbal 118 in the image capturing position. Similar to the above-described first control, the lens protecting position is stored in the ROM 115 in advance, and is loaded into the RAM 114 for use when the control program of the drone 160 is executed.

Referring to FIG. 5A, in step S501, the operator creates an image capturing plan. The image capturing plan is a combination of an approach route image capturing plan and a returning route image capturing plan. The approach route image capturing plan and the returning route image capturing plan are each formed by setting a sequence of movements of the drone 160 and position changes of the image capturing apparatus 150, and include at least a flight route, flight speeds, position change points of the image capturing apparatus 150, and position information of the image capturing apparatus 150. The approach route refers to the portion of the route from where the drone 160 receives an instruction for executing the image capturing plan to where the drone 160 notifies the operator of completion of the first image capturing preparation. The returning route refers to the portion of the route from where the drone 160 receives a returning instruction to where the drone 160 arrives at the returning point.

The process from step S502, where the operator instructs the drone 160 to execute the image capturing plan, to step S509, where the drone 160 positions the gimbal 118 in the image capturing position for the first time, is the same as steps S402 to S409 in the above-described first control. Thus, description thereof is omitted herein.

When the positioning of the gimbal 118 in the image capturing position is completed, in step S510, the drone microcomputer 113 notifies the operator (controller 200) of completion of the image capturing preparation. The notification of completion of the image capturing preparation is displayed on the display section 201 of the controller 200. Then, in step S511, the operator confirms the notification displayed on the display section 201. In step S512, based on the live view image of the image capturing apparatus 150, the GPS information, and the like, which are displayed on the controller 200, the operator operates the controller 200 and instructs the drone microcomputer 113 to move the drone 160 to the image capturing point.

Upon receipt of the instruction for moving the drone 160 to the image capturing point in step S512, in step S513, the drone microcomputer 113 controls the movement of the drone 160 to the image capturing point. In step S514, the drone microcomputer 113 determines whether the drone 160 has arrived at the image capturing point. If it is determined that the drone 160 has not arrived at the image capturing point, the flow returns to step S513. If it is determined that the drone 160 has arrived at the image capturing point, the flow proceeds to step S515.

In step S515, the drone microcomputer 113 notifies the operator (controller 200) of completion of the movement. The movement completion notification is displayed on the display section 201 of the controller 200. Then, in step S516, the operator confirms the notification displayed on the display section 201. The operator can confirm the position information of the drone 160 from the live view image or the GPS information, which is displayed on the display section 201 of the controller 200, and determine that the movement of the drone 160 is completed by confirming that the displayed information indicates a desired image capturing point.

In step S517, the operator instructs the image capturing apparatus 150 (camera microcomputer 103) to perform image capturing via the controller 200 and the drone 160 (drone microcomputer 113). In step S518, the drone microcomputer 113 converts the image capturing instruction to a protocol of communication with the image capturing apparatus 150 as required and sends the image capturing instruction to the camera microcomputer 103. In step S519, the camera microcomputer 103 performs image capturing and stops the image capturing based on the image capturing instruction.

In step S520, the operator checks whether the image capturing is completed at all image capturing points. Referring to FIG. 5B, in step S521 following step S520, if it is determined that there is a point where the image capturing has not been performed yet, the flow proceeds to step S522. In step S522, the operator checks whether it is necessary to change the position of the image capturing apparatus 150.

In step S523, if it is determined that it is not necessary to change the position of the image capturing apparatus 150, the flow returns to step S512. If it is determined that it is necessary to change the position of the image capturing apparatus 150, the flow proceeds to step S524. In step S524, the operator operates the controller 200 to instruct the drone microcomputer 113 to perform control to position the gimbal 118 in the lens protecting position.

If it is determined in step S521 based on a result of the check in the step S520 that the image capturing is completed at all image capturing points, the flow proceeds to step S525. In step S525, the operator instructs the drone microcomputer 113 to return the drone 160.

Upon receipt of the returning instruction in step S525 or the instruction for controlling the gimbal 118 in step S524, the flow proceeds to step S526. In step S526, the drone microcomputer 113 performs control to position the gimbal 118 in the lens protecting position. In step S527, the drone microcomputer 113 determines whether the positioning of the gimbal 118 in the lens protecting position is completed. If it is determined that the positioning is not completed, the flow returns to step S526. If it is determined that the positioning is completed, the drone microcomputer 113 locks the gimbal 118 and the flow proceeds to step S528.

In step S528, the drone microcomputer 113 checks whether the returning instruction has been received (step S525). In step S529, if the drone microcomputer 113 determines based on a result of the check in step S528, that the returning instruction has not been received, the flow proceeds to step S532.

In step S532, the drone microcomputer 113 notifies the operator (controller 200) that the positioning of the gimbal 118 in the lens protecting position is completed. The notification of completion of the positioning of the gimbal 118 is displayed on the display section 201 of the controller 200. Then, in step S533, the operator confirms the notification displayed on the display section 201. In step S534, the operator instructs the drone microcomputer 113 to move the drone 160 to a next position changing point of the image capturing apparatus 150 based on the position information of the drone 160, and the flow proceeds to step S506 in response to the instruction received in the step S534. In step S506 at this time, in a case where an image capturing apparatus for observing the surroundings of the drone 160 is attached in addition to the image capturing apparatus 150, the operator can instruct the movement of the drone 160 while viewing the live view image captured by this additional image capturing apparatus.

If it is determined in the step S529 that the returning instruction has been received, the flow proceeds to step S530. In step S530, the drone microcomputer 113 performs control to move (fly) the drone 160 to the returning point. In step S531, the drone microcomputer 113 determines whether the drone 160 has arrived at the returning point. If it is determined that the drone 160 has not arrived at the returning point, the flow returns to step S530. If it is determined that the drone 160 has arrived at the returning point, the process is terminated.

In the above-described second control, the operator issues a returning instruction to the drone 160 after the operator has confirmed that the image capturing is completed at all image capturing points. In another embodiment, the operator can issue an urgent returning instruction to the drone 160. In yet another embodiment, the drone 160 (drone microcomputer 113) issues an urgent returning instruction and flies if communication between the controller 200 and the drone 160 is interrupted or the battery charge level is significantly lowered. In each of these embodiments, the procedure from issuance of the returning instruction to arrival at the returning point is performed in the order of steps S526, S527, S530, and S531 (arrival).

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-137143 filed Aug. 30, 2022, which is hereby incorporated by reference herein in its entirety.

What is claimed is:

1. An image capturing system comprising:
a device that is capable of flying; and
an image capturing apparatus attached to the device and comprising a lens, a lens barrel containing the lens, and an adjustment unit configured to adjust a length of the lens barrel,
wherein the device comprises:
a drive unit configured to hold the image capturing apparatus and change a position of the image capturing apparatus, and
a control unit configured to control the drive unit in a direction in which the lens of the image capturing apparatus is oriented toward a main unit of the device in a case where image capturing is not performed by the image capturing apparatus, and
wherein the adjustment unit adjusts the length of the lens barrel such that a front end face of the lens is positioned close to the main unit after the lens is oriented toward the main unit.

2. The image capturing system according to claim 1, wherein the drive unit includes a lock unit configured to lock the drive unit in a state where the lens of the image capturing apparatus is oriented toward the main unit of the device.

3. The image capturing system according to claim 1, wherein the device further comprises an instruction unit configured to instruct the image capturing apparatus to start and stop image capturing, and
wherein in a case where it is determined that the image capturing is terminated, the control unit controls the drive unit in the direction in which the lens of the image capturing apparatus is oriented toward the main unit of the device.

4. The image capturing system according to claim 1, further including a storage unit configured to store at least one returning point, and
wherein the control unit starts control to move the device to the returning point and controls the drive unit in the direction in which the lens of the image capturing apparatus is oriented toward the main unit of the device.

5. The image capturing system according to claim 1, wherein after the control unit controls the drive unit in the direction in which the lens of the image capturing apparatus is oriented toward the main unit of the device, the control unit transmits a command for adjusting the length of the lens barrel to the adjustment unit.

6. A method of controlling an image capturing system comprising a device that is capable of flying, and an image capturing apparatus attached to the device and comprising a lens and a lens barrel containing the lens, the device comprising a drive unit configured to hold the image capturing apparatus and change a position of the image capturing apparatus,
the method comprising:
controlling flight of the device;
controlling the drive unit in a direction in which the lens of the image capturing apparatus is oriented toward a main unit of the device in a case where image capturing is not performed by the image capturing apparatus during flight of the device; and adjusting a length of the lens barrel such that a front end face of the lens is positioned close to the main unit of the device after the lens is oriented toward the main unit.

7. A non-transitory computer-readable storage medium storing a program for causing a computer to execute a method of controlling an image capturing system comprising a device that is capable of flying, an image capturing apparatus attached to the device and comprising a lens and a lens barrel containing the lens, the device comprising a drive unit configured to hold the image capturing apparatus and change a position of the image capturing apparatus, the method comprising:

controlling flight of the device; and controlling the drive unit in a direction in which the lens of the image capturing apparatus is oriented toward a main unit of the device in a case where image capturing is not performed by the image capturing apparatus during flight of the device; and adjusting a length of the lens barrel such that a front end face of the lens is positioned close to the main unit after the lens is oriented toward the main unit.

* * * * *